United States Patent [19]

Rickard

[11] Patent Number: 4,736,366
[45] Date of Patent: Apr. 5, 1988

[54] BUS ACQUISITION SYSTEM

[75] Inventor: Dale A. Rickard, Manassas, Va.

[73] Assignee: International Business Machines Corporation, Armonk, N.Y.

[21] Appl. No.: 828,911

[22] Filed: Feb. 13, 1986

[51] Int. Cl.$^4$ .............................................. H04J 3/02
[52] U.S. Cl. .................................... 370/85; 340/825.5
[58] Field of Search ............................. 370/85, 89, 67; 340/825.5, 825.51; 371/32

[56] References Cited

U.S. PATENT DOCUMENTS

| | | | |
|---|---|---|---|
| 4,295,122 | 10/1981 | Hatada et al. | 340/825.5 |
| 4,320,457 | 3/1982 | Tanikawa | 364/200 |
| 4,464,749 | 8/1984 | Ulug | 370/85 |
| 4,503,533 | 3/1985 | Tobagi et al. | 370/85 |
| 4,510,599 | 4/1985 | Ulug | 370/85 |
| 4,517,670 | 5/1985 | Ulug | 370/85 |
| 4,535,448 | 8/1985 | Baxter et al. | 370/85 |
| 4,542,380 | 9/1985 | Beckner et al. | 340/825.5 |
| 4,593,282 | 6/1986 | Acampora et al. | 370/85 |
| 4,626,843 | 12/1986 | Szeto et al. | 370/85 |

OTHER PUBLICATIONS

IBM *Technical Disclosure Bulletin*, Bederman, "Decentralized Interrupt Logic for Multi Processor Systems Using Relative Addressing of Register Space" vol. 21, No. 11, Apr. 1979, pp. 4519–4523.
IBM *Technical Disclosure Bulletin*, Korte, "Multi Tasking Micro Process Level Instructions" vol. 26, No. 6, Nov. 1983, pp. 2881–2882.
IBM *Technical Disclosure Bulletin*, Lotspiech, et al., Generalized Interrupt Handler for a Forth Machine", vol. 26, No. 7A, pp. 3839–3844.

*Primary Examiner*—Douglas W. Olms
*Attorney, Agent, or Firm*—H. St. Julian; John E. Hoel

[57] ABSTRACT

A bus communication system is disclosed which provides low bus acquisition latency while supporting large block data transfers. A first device, which has control of a communication bus, detects a request for control of the bus during a transfer of the data to a second device. The first device then determines whether the transfer of data can be completed within a predetermined time period. A suspend signal is generated and transmitted to the second device in the event that the transfer of data cannot be completed within the predetermined period of time. The second device, in response to the suspend signal, sends to the first device, a plurality of control words which sets forth the information that the servant unit will require from the bus master to identify and resume the message at a later time. The first device stores the control words and relinquishes control of the bus. Thereafter, when the first device regains control of the bus, it transmits to a second device the control words and then resumes the transmission of the suspended data.

3 Claims, 4 Drawing Sheets

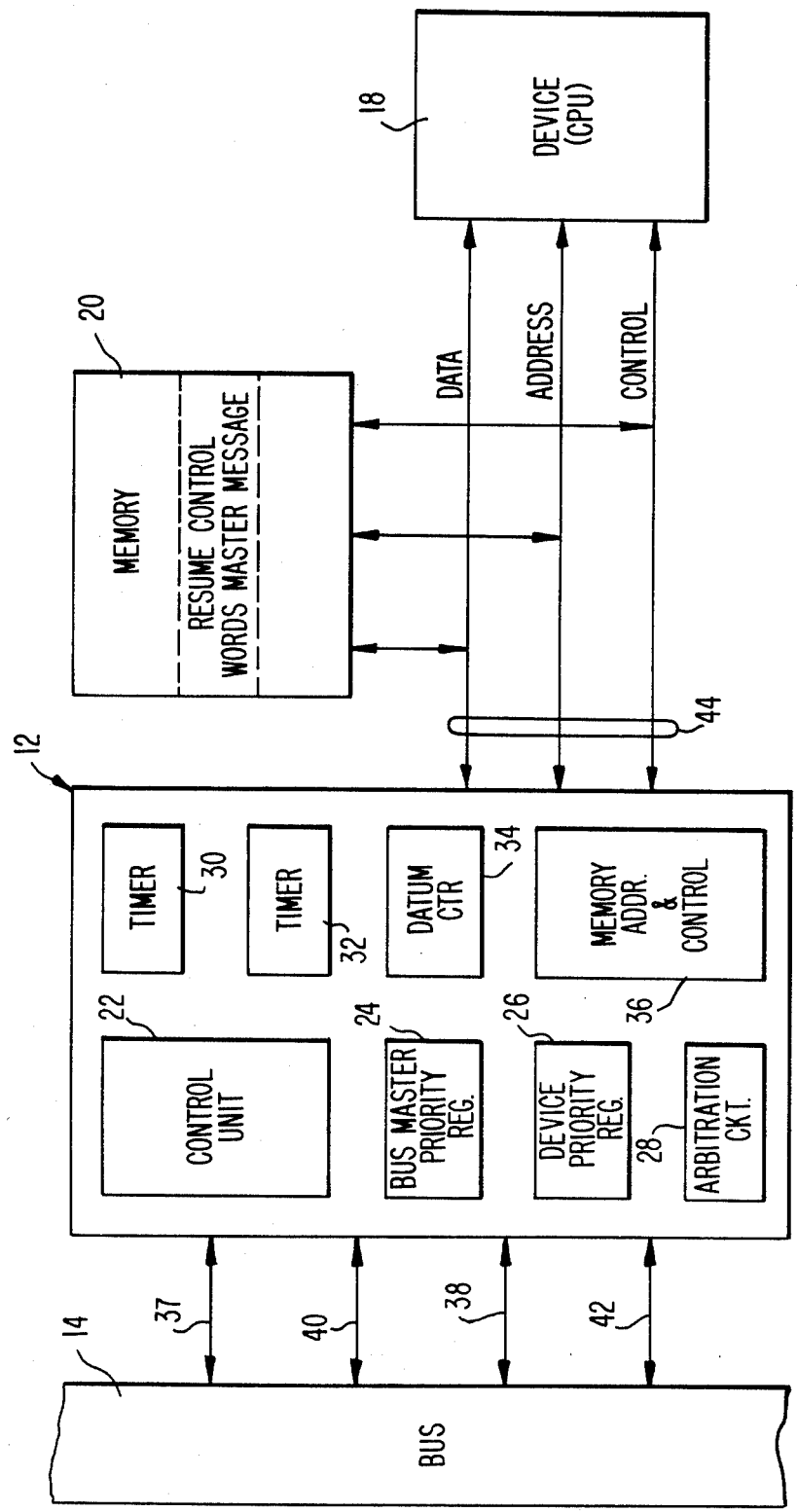

BUS ACQUISITION SYSTEM

TECHNICAL FIELD

The invention disclosed broadly relates to bus communication systems and more particularly relates to the acquisition of control of the bus by a device during block transfer of data.

BACKGROUND OF THE INVENTION

Communications buses are often required to provide low bus acquisition latency for high priority communications and to support large block data transfers. These requirements usually conflict and reduce the efficiency of the transfer of data. One prior art bus system allows for the transfer of data over the bus without permitting any interruptions from a device having a higher priority. This system has an extremely high rate of data transfer. However, this system while less expensive and less complex, is not capable of meeting the bus acquisition latency requirement of real time systems since a low priority bus master cannot relinquish control of the bus to a device having a higher priority in a timely manner. A second solution to the above identified conflict is to (1) break large data blocks into smaller blocks and transmit the blocks as a plurality of short messages or (2) packetize the data into sub-blocks and provide a method of interrupting the transfer thereof at one of the boundaries of a packet. Since the block data transfer can only be interrupted at the end of a message or data packet, the bus acquisition latency requirement places an upper limit on the message or data packet size. Therefore, this solution introduces unnecessary overhead expense in that it requires the transmission of multiple message headers or performing what may be unnecessary data packetization. Moreover, this overhead expense exists irrespective of a higher priority request for the bus during a block data transfer. This is an important consideration since, although the allowable bus acquisition latency is often small, which requires a large number of data packets to transmit a block of data, the number of high priority messages that require the block data transfers to be interrupted is also generally small resulting in a high packetization overhead.

Consequently, there is a need for a bus system which provides low bus acquisition latency for high priority communications and supports large block data transfers without having a high overhead.

OBJECTS OF THE INVENTION

It is therefore an object of the invention to provide an improved bus acquisition system.

It is another object of the invention to provide low bus acquisition latency for high priority communications.

It is further object of the invention to support large block data transfers.

It is still another object of the invention to provide an improved bus communication system which eliminates the requirement for artificially sub-blocking the data transfer based on the possibility that an interrupt maybe required.

It is yet a further object of the invention to provide a low overhead message suspend/resume capability that only introduces sub-blocking when an interrupt actually occurs.

SUMMARY OF THE INVENTION

These and other objects, features and advantages of the invention are accomplished by the bus acquisition system disclosed herein. The present invention relates to methods of and systems for a device or bus master to signal a servant unit during a data block transfer indicating that the data block transfer is being suspended. The service unit then signals the bus master that the suspend signal has been recognized and will be honored. A higher priority request for bus mastership starts the current bus master's interval timer. This timer determines the maximum length of time which is allow before the current bus master is required to relinquish control of the bus. Before the maximum length of time has expired, the bus master must suspend the block data transfer and store a plurality of control words which are received from the servant unit. Thereafter, a current bus master must relinquishes control of the bus to permit the higher priority bus master to gain control thereof. Once the higher priority communication is complete the suspended bus master regains control of the bus and resumes the suspended data block transfer by transferring to the servant unit a resume code and the plurality of control words.

The present invention, together with other and further advantages and features thereof, will be readily understood from the following detailed description when taken with the accompanying drawings.

BRIEF DESCRIPTION OF THE DRAWINGS

FIG. 2 is a schematic drawing of one of the plurality of bus interface units of FIG. 1 in accordance with the present invention.

DESCRIPTION OF THE PREFERRED EMBODIMENT

Figure 1:
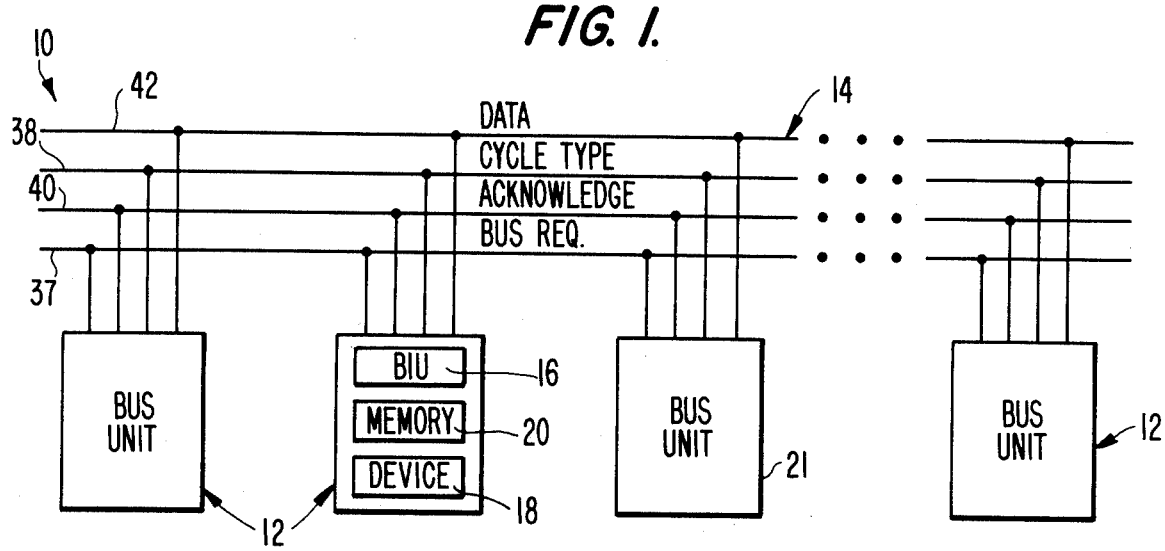
FIG. 1 is a block diagram showing plurality of bus interface units and their respective devices which are coupled to a communications bus.

Referring to FIG. 1, there is shown a bus communication system 10 having a plurality of bus units 12 coupled to a communications bus 14. Each of the bus units 12 includes a bus interface unit 16 and an associated control device 18. Each of the bus units 12 also include a memory circuit 20. The bus units 12 are capable of transmitting messages onto the communication bus 14 and receiving messages from the bus. Alternately, each of the bus units 12 is capable of serving as a bus master, the unit which is currently in control of the bus 14 or as a servant unit, such as bus unit 21. The servant unit, such as unit 21, is selected by the bus master to participate in a message sequence.

Referring to FIGS. 1 and 2, the bus interface unit 12 includes a control unit 22, such as a finite state machine, a current bus master priority register 24, a device priority register 26, and arbitration circuit 28, two programmable interval timers 30 and 32, a datum counter 34 and memory address and control logic circuit 36. Each device 18 in the bus system 10 has a predetermined priority which is stored in the device priority register 26. The priority of the bus master which is currently controlling the bus 14 is stored in the current master priority register 24. This enables each device 18, such a central processing unit, to determine whether it has a higher priority than that of the current bus master prior to asserting a bus request over line 37.

The bus communications system 10 uses a master servant protocol under which communications sequences are defined for transferring messages between bus units 12. Protocol state transition are transmitted over the cycle type lines 38 and are controlled by the bus master. The servant unit operates in synchronization with the bus master and signals compliance with protocol state transitions using the acknowledge set of lines 40. Data lines 42 provide a means for the transmission of messages between the bus master and the servant unit.

Figure 3:
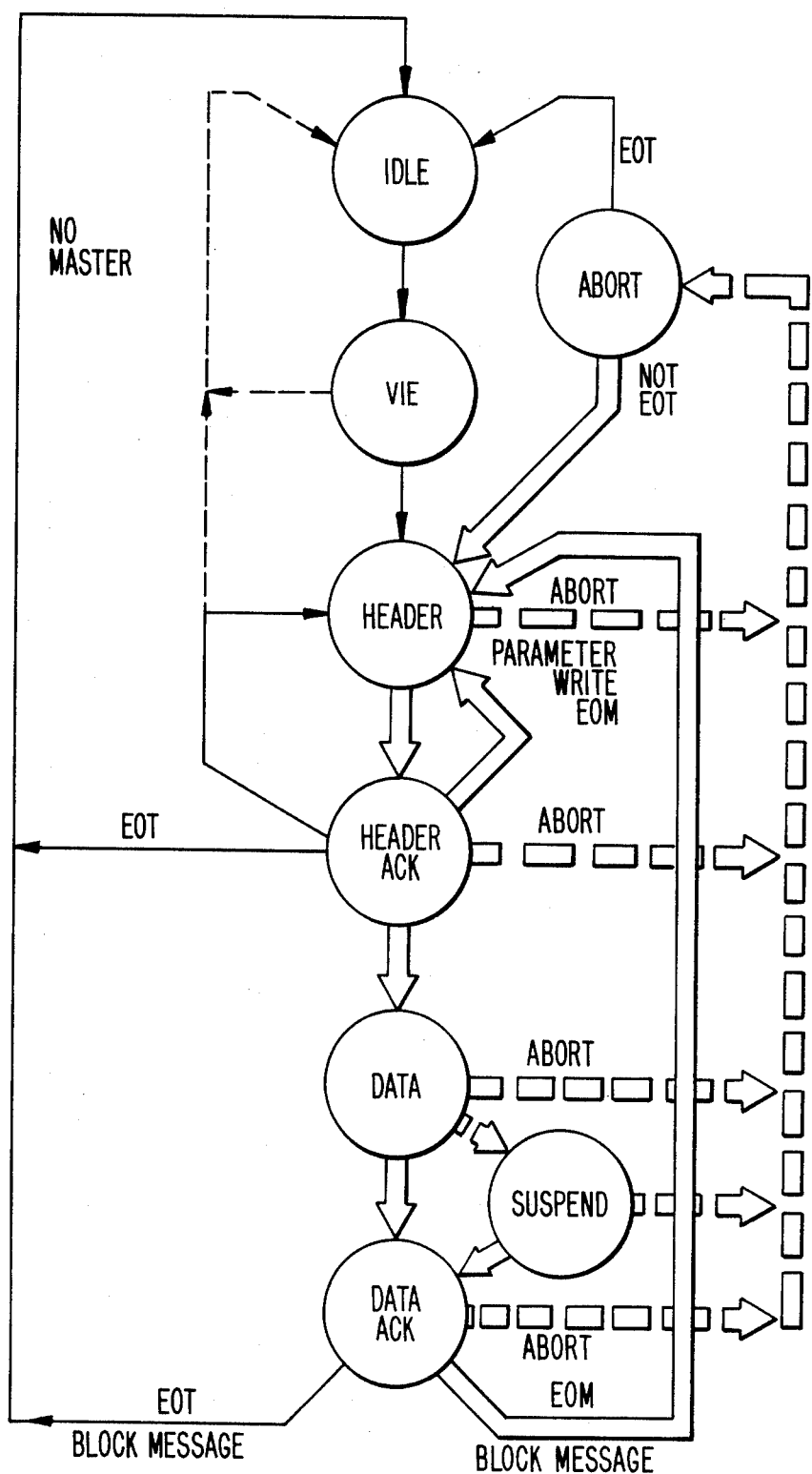
FIG. 3 is a state diagram of the bus of FIG. 1.

Referring to FIG. 3, there is shown a state diagram which sets forth the sequence of states of the protocol used for the bus communications system 10. The bus 14 shall enter an idle state whenever all cycle type lines 38 are released. During the idle state, there is no bus master and the current bus master priority code which is stored in register 24 (FIG. 2) shall be undefined. Vie is a protocol state used to select the next bus master from one or more contending bus units 12. The bus unit 12 having the highest priority will be selected as the next bus master and its priority stored in register 24. The bus master's tenure shall begin when a header state is entered from the Vie state. In the header state, information is transmitted by the bus master to specify the type of message sequence to be performed, to identify the bus units which are required to participate in the sequence as a servant unit and to define the number of data transfer cycles required for the sequence. The participating servant unit responds with a header acknowledgement which provides sequence status to the bus master. Data is the protocol state which consist of a sequence of data transfer cycles wherein the data is in the form of a block transfer. The transfer of data from the bus master to the participating servant unit is defined as a write sequence. The transfer of data from the servant unit to the bus master is defined as a read sequence. During a block data transfer, the data sequence maybe suspended by the bus master by transmitting a signal to the servant unit regarding the pending interruption of the block data transfer. The servant acknowledges the pending interruption of the block data transfer and transmits a plurality of resume control words to the bus master. The suspended block data transfer can be resumed by another block message from the bus master who's header contains a resume code and the appropriate resume control words. Data acknowledge is a protocol state during which the servant unit provides message status information to the bus master. Abort is a protocol state which is used to terminate a bus sequence during abnormal conditions such as when errors are detected.

Figure 4:
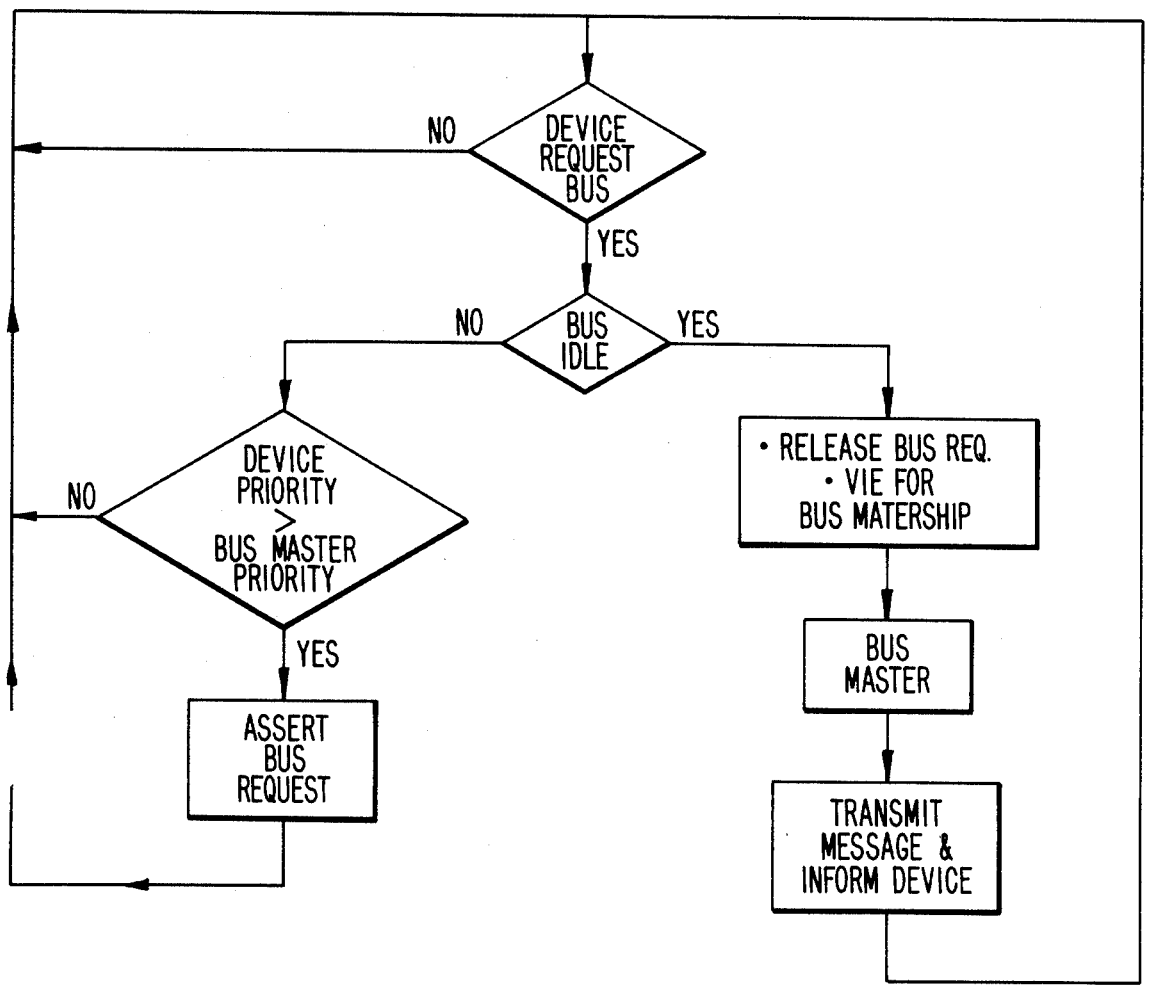
FIGS. 4 and 5 are flow diagrams which illustrate the procedure of control and operation of the bus communication system of FIG. 1 in accordance with certain principles of the invention.

Referring to FIG. 4, the flow diagram illustrated therein sets forth the procedure for acquiring mastership of the bus 14 by one of the bus units 12. The device 18, which desires control of the bus 14, transmits a signal to its associated bus interface unit 16 over lines 44 (FIG. 2). If the bus 14 is in the idle state, there will not be a current bus master. Thus, the bus unit 12 must contend for control of the bus with other bus units. The bus mastership is awarded to the bus unit 12 having the highest priority among those bus units which are contending for the bus. After the bus unit becomes the bus master, data is transmitted to the selected servant unit in accordance with the procedure which is set forth in the flow diagram of FIG. 5.

If the bus was not in the idle state when the device 18 signaled its associated bus interface unit 16, the control unit 22 compares the contents of the current bus master priority register 24 with the contents of the device priority register 26. If the requesting device 18 has a higher priority than the current bus master, the requesting bus interface unit 16 asserts a bus request on line 37. Upon detecting the bus request, the current bus master will continue to transmit messages to its selected servant unit if the transfer of the messages can be completed in a predetermined amount of time. Otherwise, the bus master must suspend the transmission of the messages and relinquish control to the bus unit which asserted the bus request. The new bus master then follows the procedure as set forth in the flow diagram of FIG. 5.

Figure 5:
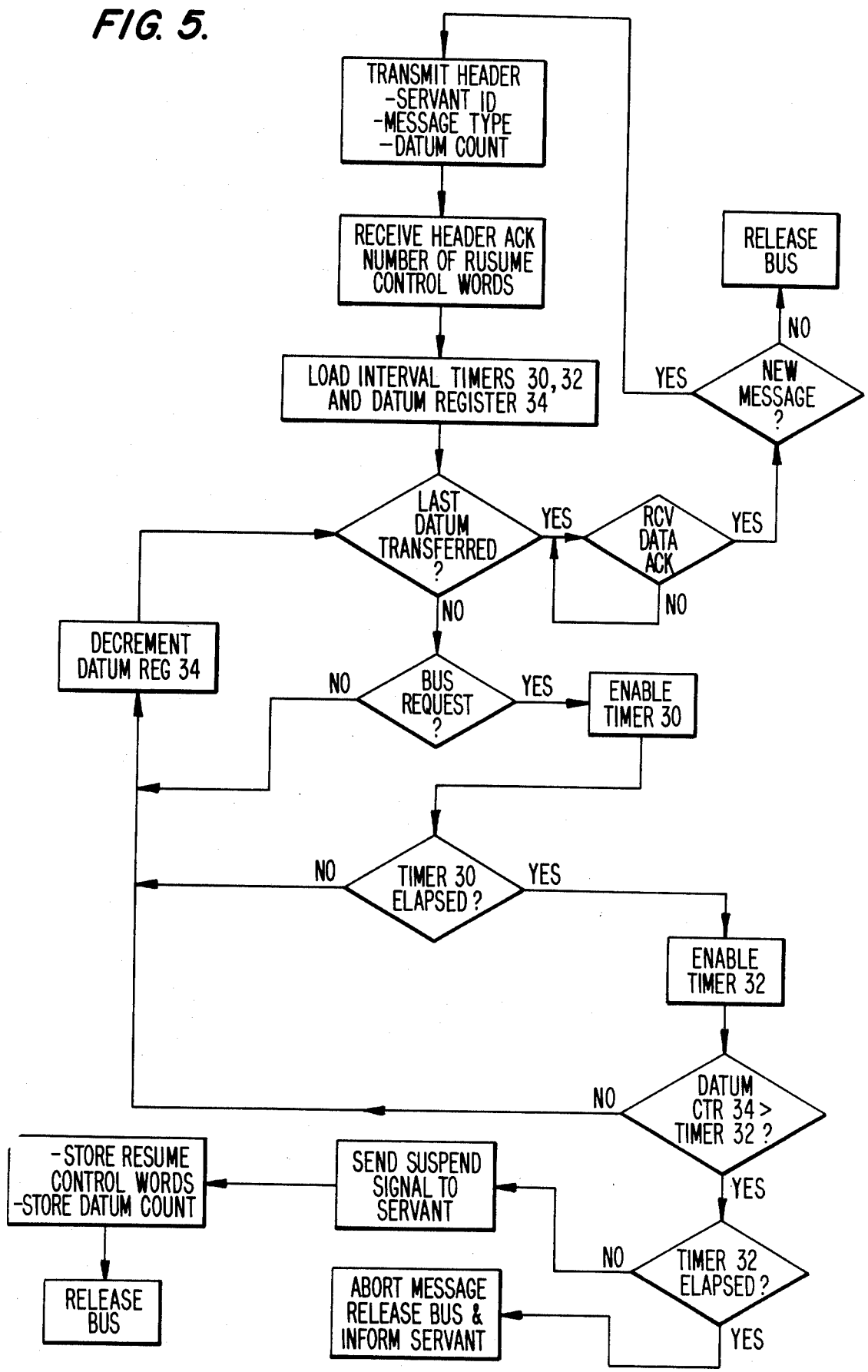

Referring to FIG. 5, the flow diagram illustrated therein reveals the steps of a general message sequence between the bus master and the participating servant unit under control of the control unit 22 (FIG. 2). For purposes if illustration, let us assume that a bus unit has gained control of the bus 14 and is acting as the bus master. The bus master initiates a message sequence by transmitting header information over the data lines 42 (FIG. 2). The bus master also places a symbol H0 or the binary code 101 on the cycle type lines 38 during a first bus cycle. Thereafter, the bus master places a symbol H or binary code 010 on the cycle type lines 38 for each of the remaining bus cycles of the header transfer. The header information specifies the bus unit 12 which is selected as the servant unit for the message sequence, the type of message sequence and the datum count which informs the servant unit of the amount of time in bus cycles required to transfer the message. The selected servant unit signals its participation in the message by acknowledging the header and placing a recognition symbol RCG or the binary code 01 on the acknowledge set of lines 40. The bus master then places a header acknowledge cycle symbol A or the binary code 011 on the cycle type lines 38 during the header acknowledge cycle. The servant unit shall indicate synchronization with the bus master by placing and acknowledgement symbol ACK or binary code 10 on the acknowledge set of lines 40 during the header acknowledge cycle. Additionally, the servant unit also transmits over data lines 42 a code for the number of resume control words which it will send to the bus master in case of an interruption of the block data transfer. Thereafter, the bus master places a symbol D or the binary code 001 on the cycle type lines 38 during each cycle of a data sequence. The servant unit responds by posting the symbol RCG or binary code 01 on the acknowledge set lines 40 during each cycle of the data sequence. The interval timers 30 and 32 are then loaded with their respective predetermined time periods and the datum count is stored in the datum counter 34.

If all of the data is transmitted without a bus request being asserted by another bus unit 12, the servant unit will acknowledge the transfer of data. The control unit 22 then releases the bus if there is not a new message sequence to be transmitted by the current bus master or it enables the transmission of a new header which relates to the new message.

If during the data sequence a bus request is asserted, the control unit 22 activates the first interval timer 30 having a first predetermined time period and continues to transmit data to servant unit. After the first predetermined time period has elapsed, the control unit 22 activates the second interval timer 32 having a second predetermined time period and then compares the datum counter 34, which contains the number of bus cycles required to transmit the remaining portion of the message with the contents of interval timer 32. If the datum counter 34 is greater then the interval timer 32, the control unit 22 then sends a message to the servant unit over the cycle type lines 38 indicating that the transfer of messages will be suspended. The servant unit acknowledges the signal regarding the suspension and transmits to the bus master a plurality of resume control words which constitute the information that the servant unit will require from the bus master to identify and resume the message at a later time. The bus master then stores the resume control words in its memory circuit 20 and then releases the bus by removing all signals from the bus 14. Alternately, if the contents of the interval timer 32 was greater than the contents of the datum counter 34, the bus master (1) continues to transmit the message sequence to the servant unit, (2) receives an acknowledgement of the data transfer from the servant unit, and (3) releases the bus by removing all signals from the cycle type lines 38. When the previous bus master regains control of the bus, it transmits to the servant unit a header which includes the resume control words and a resume code which is a binary code 111. Thereafter the bus master then completes his transfer of the message sequence to the servant unit.

As noted above, the present invention allows a bus unit 12 having a higher priority than the current bus master to interrupt an on-going transfer of data if the time required to transmit the remaining portion of the data exceeds a predetermined period of time. Alternately, the transmission of data is not interrupted if the time required to suspend the transfer of data in order to service the bus unit having a higher priority exceeds the time required to transmit the remaining data. Thus, the present invention increases the efficiency of the data transfer by considering the length of time required to transmit the remaining data by the current bus master and allowing efficient use of the allowable bus acquisition interval for data transmission. Timers 30 and 32 are programmable and their respective predetermined timer periods can be adjusted to meet the bus acquisition latency requirements of a selected application. This also increases the efficiency of the data transfer by reducing overhead. Moreover, upon suspension of the transfer of data in order to service higher priority communications, the servant unit transmits a plurality of control words to the bus master. These resume control words are retained by the bus master and are returned to the servant unit when the transfer of data to the servant unit is resumed. Since the servant bus interface is allowed to transmit all of the essential information regarding the suspended message to the bus master for safekeeping, all of the servant bus interface's resources are available to support the higher priority communications. This reduces the possibility of bus deadlock which occurs when the servant bus interface's resources are utilized in maintaining information regarding the suspended message and the unit is not available to support the higher priority communications. Alternately, the servant bus unit can store information regarding the suspended message in memory 20 (FIG. 2) and send the address of this storage area to the bus master as the resume control words. This reduces the amount of information that must be transferred over the bus 14 and improves the efficiency. The number of resume control words is determined by the servant unit at the beginning of the message and is transmitted to the bus master in the header acknowledgement. As also noted above, the bus master sends a datum count to the servant when the message is resumed. Thus, the servant unit does not have to store that information and the overhead for the suspend operation is reduced. The storage of the resume control words also removes any limitations on the number of suspended messages that a single servant unit can support. Once the higher priority communications are complete, the suspended bus master regains control of the bus and resumes the suspended message by returning the resume control words to the servant unit. In the present invention, this is accomplished by transmitting a header to the servant unit which included the resume code and the resume control words.

What is claimed is:

1. A bus communication system, which comprises:
a data transmission bus;
a plurality of bus interface units coupled to said data transmission bus, each of the bus interface units being capable of transmitting data onto and receiving data from said bus, a first of the bus interface units having control of the bus, wherein each bus interface unit comprises:
means for detecting a request for control of the data bus;
means, responsive to the detecting means, for transmitting a message to a second of the bus interface units;
means for storing a plurality of control words received from the second of the bus interface units;
means for relinquishing control of the bus;
means for recapturing control of the bus; and means, responsive to the recapturing means, for transmitting the stored control words to the second of the bus interface units in order to resume transmission of data thereto.

2. The bus communication system as recited in claim 1 wherein the transmitting means comprises:
a timer means to measure the duration required to transmit the data being transmitted by the first of the bus interface units;
means, responsive to the detecting means, for initiating the timer means;
said message being transmitted to the second of the bus interface units and control of the bus being relinquished if said duration is greater than a predetermined value.

3. The bus communication system as recited in claim 2 wherein the means for recapturing control of the bus comprises:
a first register means for storing the priority of the bus interface unit;
a second register means for storing the priority of a bus unit which is currently controlling the bus;
means for comparing the contents of the first register means with the contents of the second register means; and
means for asserting a request for control of the bus if the contents of the first register means is greater than the contents of the second register means.

* * * * *